United States Patent [19]

Schenkel et al.

[11] 3,748,398

[45] July 24, 1973

[54] CIRCUIT ARRANGEMENT FOR DETERMINING THE EXISTENCE OF A CALLING CONDITION ON CHANNELS OF A MULTIPLEX RADIOTELEPHONE COMMUNICATION SYSTEM

[75] Inventors: Klaus Dieter Schenkel, Ay, Iller; Friedhelm Hillebrand, Ulm, Danube, both of Germany

[73] Assignee: Licentia Patent-Verwaltungs-G.m.b.H., Frankfurt am Main, Germany

[22] Filed: Oct. 13, 1971

[21] Appl. No.: 188,814

[30] Foreign Application Priority Data

Oct. 13, 1970 Germany .................. P 20 50 116.0

[52] U.S. Cl. ........ 179/41 A, 179/15 A, 179/15 BY, 179/84 VF

[51] Int. Cl. .......................................... H04m 11/00

[58] Field of Search ....................... 179/41 A, 2.5 R, 179/18 FF, 16 E, 16 EC, 16 A, 84 VF, 15 BM; 307/233, 234, 261; 325/320, 16; 178/66, 88

[56] References Cited

UNITED STATES PATENTS

| | | | |
|---|---|---|---|
| 3,454,718 | 7/1969 | Perreault | 325/20 |
| 3,223,783 | 12/1965 | Yamamoto | 179/84 UF |
| 3,691,306 | 9/1972 | Molo | 179/15 BF |

FOREIGN PATENTS OR APPLICATIONS

| | | | |
|---|---|---|---|
| 2,032,763 | 1/1971 | Germany | 179/15 BF |

*Primary Examiner*—Kathleen H. Claffy
*Assistant Examiner*—David L. Stewart
*Attorney*—George H. Spencer et al.

[57] ABSTRACT

A circuit arrangement responsive to dialing information signals and signaling information signals and for determining a calling condition on a channel of a frequency multiplex radiotelephone communication system. Switching means are provided for cyclically switching a receiver means to individual channels of the communication system. The individual channels are each effectively coupled to an evaluation circuit for a given time interval $t_a$ which is short compared to the duration of the dialing information signals or the signaling information signals. The evaluation circuit has a response time less than the time interval $t_a$ which is short compared to the duration of the dialing information signals or the signaling information signals. The evaluation circuit has a response time less than the time interval $t_a$ and determines whether each of the individual channels is free or occupied, the evaluation circuit being effective for detecting dialing information signals or signaling information signals thereby determining the presence of such signals.

9 Claims, 4 Drawing Figures

PATENTED JUL 24 1973 3,748,398

CIRCUIT ARRANGEMENT FOR DETERMINING THE EXISTENCE OF A CALLING CONDITION ON CHANNELS OF A MULTIPLEX RADIOTELEPHONE COMMUNICATION SYSTEM

BACKGROUND OF THE INVENTION

This invention relates to a circuit arrangement responsive to dialing information signals and signaling information signals and for determining the channel occupation state in a frequency multiplex communication system. In particular, the invention relates to a circuit arrangement responsive to dialing information signals and signaling information signals and for determining by means of an evaluation circuit responsive to the information signals the channel occupation state in a frequency multiplex communication system.

In communication systems in which all users have available a plurality of frequency separated channels (frequency multiplex) there exists a problem when establishing a connection, to determine whether a channel is free or occupied by either dialing information signals or signaling information signals and to select a free channel. Moreover, each user must be able to receive correctly and to recognize a call transmitted for him in any one of the separated channels, this call representing a desire for a connection and being present in the form of dialing information signals often in the form of binary signals.

It has been the custom in frequency multiplex communication systems to check for channel occupany with the aid of squelch control circuits. Squelch control circuits which are controlled by a low frequency signal have a response time of about 10-50 ms. Squelch control circuits which are responsive to a high frequency signal have a much shorter response time but are generally more subject to interference, which results in malfunction, and are therefore seldom used.

There exist several possibilities for receiving and detecting dialing information signals and signaling information signals.

Firstly, all dialing information signals may be transmitted over a separate calling channel; however, an undesirable reduction of the frequency bandwidth available in the communication system for the actual transmission of data in the form of signaling information results.

Secondly, the dialing information signals may be transmitted over the same channel over which data transmission, in the form of signaling information signals, also takes place. All users which are not themselves exchanging communications, search all channels with a low frequency controlled squelch control circuit and recognize the first channel, in a predetermined channel sequence, in which the dialing information signals are to appear in that the carrier for the first recognized channel is unmodulated and is ready to receive dialing information signals. All users lock in on this first recognized channel for receiving dialing information signals. A number of disadvantages, however, exist. Among the disadvantages are:

1. a relatively long response time of the low frequency squelch control circuit;

2. all users are blocked and a further, a separate call on another channel remains ineffective; and 3. complicated control means are required to determine whether a chnnel has been newly occupied or whether there exists only a pause in an existing data transmission or conversation.

The drawbacks of the substantial time required to receive and to identify dialing information signals and signaling information signals are very annoying and the problem exists of eliminating these drawbacks.

SUMMARY OF THE INVENTION

It is an object of the invention to provide, in a circuit arrangement responsive to dialing information signals and signaling information signals, an evaluation circuit which has a response time less than the duration of the signals.

It is another object of the invention to provide, in a circuit arrangement for determining channel occupation state or calling state in a frequency multiplex radiotelephone communication system, an evalucation circuit which has a response time less than the duration of dialing information signals or signaling information signals.

It is a further object of the invention to provide, in a circuit arrangement responsive to dialing information signals and signalling information signals and for determining channel occupation state in a frequency multiplex system, an evaluation circuit which has a short response time and allows rapid channel scanning.

It is an additional object of the invention to provide, in a circuit arrangement for determining channel occupation state in a frequency multiplex communication system, an evaluation circuit which determines and identifies the presence of dialing information signals or signaling information signals on each channel, any one of which may be used for dialing information signals.

It is an additional object of the invention to provide an improved circuit arrangement responsive to dialing information signals and signaling information signals in a frequency multiplex communication system which does not require a separate channel for dialing information signals.

It is yet another object of the invention to provide an improved circuit arrangement responsive to dialing information signals and signaling information signals in a frequency multiplex communication system which does not require all users to lock on one single channel to receive and to send dialing information signals.

These and other objects of the invention may be accomplished in a circuit arrangement responsive to dialing information signals and signaling information signals and for determining channel occupation state in a frequency multiplex communication system, by providing switching means for cyclically switching a receiver means to individual channels of a communication system. The individual channels are each effectively coupled to an evaluation circuit for a given time interval $t_a$ which is short compared to the duration of the dialing information signals or the signaling information signals. The evaluation circuit has a response time less than the time interval $t_a$ and determines whether each of the individual channels is free or occupied, the evaluation circuit being effective for detecting dialing information signals or signaling information signals thereby determining the presence of such signals.

Advantageously, the circuit arrangment may employ an evaluation circuit comprising a coincidence circuit for evaluating the dialing information signals or the signaling information signals. In this particular circuit arrangement the scanning frequency of the switching means could advantageously be $f_s = 1/nt_a = k \cdot f_i$ for $k = 1, 2, 3 \ldots$, when $f_i = 1/t_i$, $t_i$ being the pulse width of a bit of the dialing information signals or the signaling information signals.

The buildup time $t_e$ of the high frequency, intermediate frequency and demodulation portion of present day frequency modulation receivers is approximately 100–200 $\mu$s. Thus a minimum scanning time $t_a$ of 200–300 $\mu$s can be realized. For n channels there thus results a minimum cycle time of $n \cdot t_a$. Dialing information signals and signaling information signals in binary form sent over a channel must thus have at least a duration of $n \cdot t_a \cdot m$, where $m$ represents the number of bits of the dialing information signals or signaling information signals, so that their presence can be recognized in each channel during the cyclic scanning.

The dialing information signals and signaling information signals in binary form can be transmitted in the form of direct current pulses or alternating current pulses. In the latter case the digital value "1" is advantageously represented by a frequency of $f_1$ and the digital value "0" by a frequency $f_2$; $f_1$ and $f_2$ are frequencies within the transmittable low frequency range of the channel.

In order to be able to evaluate the signal states "1" and "0" in as short as possible a time, in the most favorable case during the time $t_a$, during the cyclic scanning of the channels when the dialing information signals and the signaling information signals are in the form of a.c. signals, the frequency discrimination is effected, not by passive filters but by coincidence circuits in accordance with the present invention. Coincidence circuits principally measure the time duration between two zero passages of an a.c. signal and thus have a buildup time which is independent of the bandwidth and is determined only by the spacing of two zero passages of the fed-in a.c. signal. For these coincidence circuits, one half to one whole period of the fed-in a.c. signal is thus principally sufficient in order to identify the frequency of the fed-in signal in accordance with an aspect of the present invention.

Due to the continuous cyclic scanning of all channels, It is thus easy to determine the presence of any dialing information signals and any signaling information signals simultaneously for each channel. This information may be fed in a suitable manner to memory, evaluation devices, and devices which control the functions of a receiver.

If during the short scanning of each channel the received signals are fed not only to an evaluation circuit to recognize the presence of dialing information signals or signaling information signals, but are simultaneously also fed to a squelch control circuit with a very short response time, e.g., a high frequency controlled squelch control circuit or a suitably combined high frequency and low frequency controlled squelch control circuit which fully responds in time $t_a$, then it is possible to determine during one cycle of the cyclic scanning of all channels whether they are occupied or free and whether dialing information signals or signaling information signals are being transmitted on any channel.

DESCRIPTION OF THE PREFERRED EMBODIMENTS

Figures 1, 2:
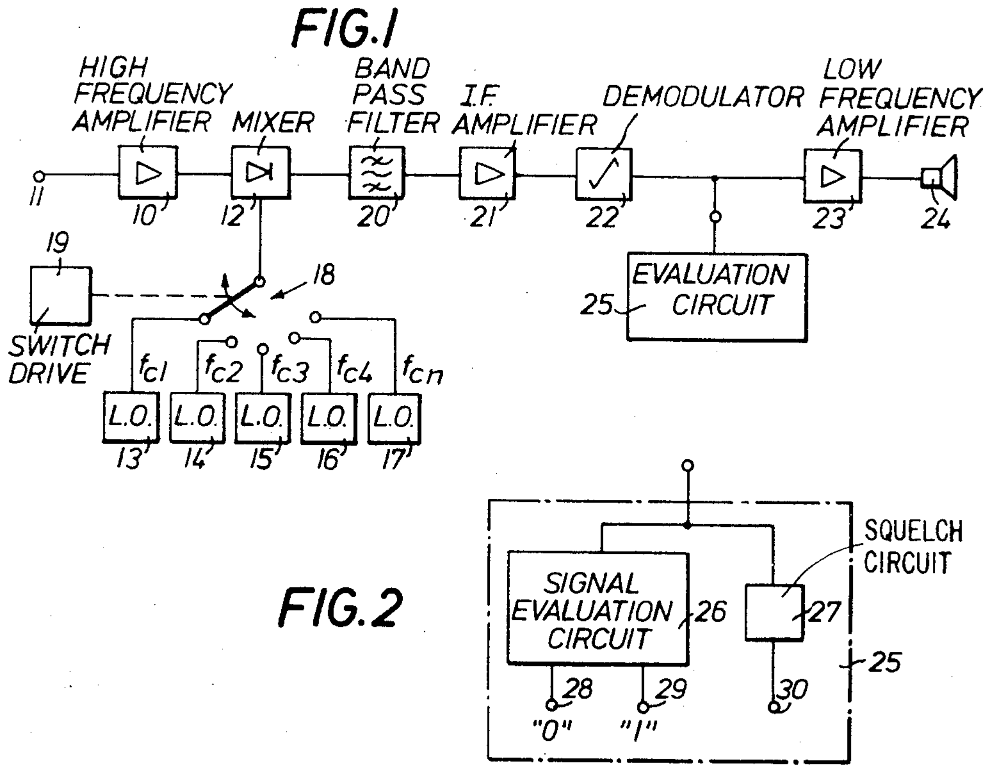
FIG. 1 is a block diagram of an exemplary circuit arrangement for determining channel occupation state in a frequency multiplex communication system according to the invention.
FIG. 2 is a block diagram of an evaluation circuit which may be used in the circuit arrangement of FIG. 1.

Referring to FIG. 1, the circuit arrangement for determining channel occupation state in a frequency multiplex communication system includes a high frequency amplifier 10 operatively arranged to receive and to amplify high frequency signals at an input terminal 11.

Amplified high frequency signals from the amplifier 10 are fed to a conventional non-linear mixer 12 which is supplied with a second input signal from one or another of a plurality of conventional local oscillators 13–17 via a switch 18. As shown, the local oscillators 13–17 supply signals having, respectively, frequencies $f_{c1}, f_{c2}, f_{c3}, f_{c4} \ldots$ and $f_{cn}$ to terminals of the switch 18. The switch 18, as illustrated, is operatively arranged to be continuously, cyclically driven by a conventional switch drive 19. It will be appreciated that the switch 18 and the switch drive 19 may be an electronic switching arrangement.

The frequency of each of the local oscillators 13–17 is selected, with respect to the frequencies of the high frequency signals arriving at the input terminal 11, so that the mixer 12 will produce, as its effective difference output, a signal of one frequency for every position of the switch 18, thereby effectively scanning all channels. While a plurality of local oscillators 13–17 are shown, it will be appreciated that the signals $f_{c1}, f_{c2}, f_{c3}, f_{c4} \ldots$ and $f_{cn}$ could be supplied from a single stepped, tunable local oscillator or the like.

The difference frequency output signal from the mixer 12 is passed, via a bandpass filter 20, to an intermediate frequency amplifier 21 which amplifies the filtered signal and supplies an input to a demodulator 22. The output of the demodulator 22 is operatively coupled, via a low frequency amplifier 23, to a utilization device 24.

The output of the demodulator 22 is also coupled to an evaluation circuit 25 shown in detail in FIG. 2.

Referring to FIG. 2, the evaluation circuit 25 consists of a signal evaluation circuit 26 and a squelch control circuit 27.

The signal evaluation circuit 26, as illustrated, has two output terminals 28 and 29 on which appear respective output signals indicating the presence of "0" and "1" signal bits forming portions of binary dialing information signals or binary signaling information signals supplied from the demodulator 22 (FIG. 1). The response time $t_a$ of the signal evaluation circuit 26 is short, the circuit responding within an interval no longer than the width of a signal bit.

In the most favorable case, the response time $t_a$ may be considerably less than the width of a signal bit. This is true when the digital values "1" and "0" are represented, respectively, by a.c. signals having frequencies $f_1$ and $f_2$. In this case, coincidence circuit are used to measure the time duration between two zero passages of the signals. Either zero passages in only one direction are used, in which case a whole period signal must be supplied to the signal evaluation circuit 26, or zero passages in two directions are used, in which case only a half period signal need be fed to the signal evaluation circuit 26.

The squelch control circuit 27, as shown in FIG. 2, also receives binary signals from the demodulator 22 (FIG. 1). The response time $t_a$ of the squelch control circuit 27 is short, allowing the circuit to respond and produce any output signal on a terminal 30 during an interval no longer than the interval the switch 18 (FIG. 1) is connected with a single terminal. The squelch control circuit 27 desirably has a response time no longer than the width of a signal bit.

In the most favorable case, when a.c. signals having frequencies $f_1$ and $f_2$ represent, respectively, the digital values "1" and "0," the squelch control circuit 27 may include coincidence circuits.

Figure 3:
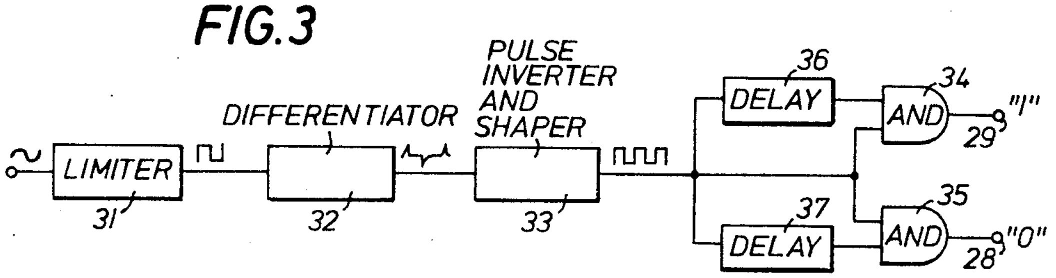
FIG. 3 is a block diagram of a signal evaluation and detecting circuit which may be used in the evaluation circuit of FIG. 2.

Referring to FIG. 3, the signal evaluation circuit 26 includes a limiter 31 which receives a.c. signals $f_1$ and $f_2$, representing, respectively, the digital values "1" and "0," from the demodulator 22 (FIG. 1). The limiter 31 acts as a squaring amplifier providing a square wave output signal.

The square wave output signal from the limiter 31 is fed to a differentiator 32 which produces a wave signal consisting of a train alternately positive and negative going pulses.

The train of alternately positive and negative going pulses from the differentiator 32 is fed to a pulse shaper and inverter 33 which produces a train of well-defined pulses of a given polarity, each representing a zero crossing of the a.c. signal received by the limiter 31 during channel scanning.

The train of well-defined pulses from the pulse inverter 33 is fed directly, as a first input, to a pair of AND circuits 34 and 35. The train of well-defined pulses is also fed, via respective delay circuits 36 and 37, as a second input, to the pair of AND circuits 34 and 35. The delay provided by the delay circuit 36 corresponds to a half period of a signal having the frequency $f_1$. The delay provided by the delay circuit 37 corresponds to a half period of a signal having the frequency $f_2$.

Whenever a signal of frequency $f_1$ is fed to the limiter 31, the AND circuit 34 responds, its output on the terminal 29 indicating the presence of a dialing information signal bit or a signaling information signal bit having the value "1." Similarly, whenever a signal of frequency $f_2$ is fed to the limiter 31, the AND circuit 35 responds, its output on the terminal 28 indicating the presence of a dialing information signal bit or a signaling information signal bit having the value "0."

If desired, the pulse inverter and shaper 33 may be replaced by a pulse clipper and shaper, in which case the pulses from the member 33 would represent zero crossings in only one direction. In this case, the delay circuits 36 and 37 would have delays corresponding, respectively, to a full period of signals of frequency $f_1$ and $f_2$.

Figure 4:
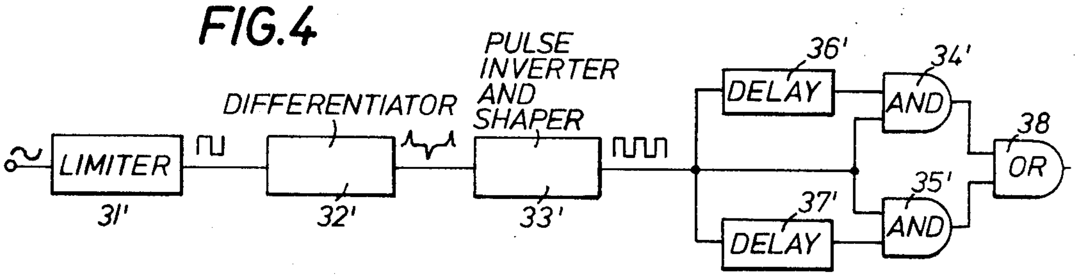
FIG. 4 is a block diagram of a squelch control circuit which may be used in the evaluation circuit of FIG. 2.

Referring to FIG. 4, the squelch control circuit 27 is constructed similarly to the signal evaluation circuit 26 as shown in FIG. 3, the numerals 31'–37' representing circuit components corresponding respectively to those identified by the numerals 31–37 in FIG. 3. The operation of the two circuits, so far as the corresponding components are involved, is essentially the same and will not be discussed in detail.

The squelch control circuit 27, as illustrated in FIG. 4, is provided with an OR circuit 38 which receives its two inputs from the AND circuits 34' and 35', the OR circuit 38 providing an output signal whenever either the AND circuit 34' or the AND circuit 35' provides an output in response to the appearance of a signal of frequency $f_1$ or $f_2$ on the input to the limiter 31' during channel scanning.

It will be understood that the foregoing description of the invention is susceptible to various modifications, changes and adaptations, and the same are intended to be comprehended within the meaning and range of equivalents of the appended claims.

I claim:

1. In a radiotelephone system having multiple frequency separated channels, a circuit arrangement for determining the presence of dialing information signals or signalling information signals on said channels comprising, in combination: receiver means; an evaluation circuit; switching means for cyclically switching said receiver means to said individual channels of the communication system; and means for effectively coupling each of said individual channels sequentially to said evaluation circuit for a given time interval which is short compared to the duration of the dialing information signals or the signaling information signals, said evaluation circuit having a response time less than the given time interval and being effective for detecting dialing information signals or signaling information signals, whereby the calling state of each of the individual channels is determined from the presence and absence of the dialing or signaling information signals.

2. The circuit arrangement as defined in claim 1 wherein said evaluation circuit comprises a coincidence circuit means for evaluating dialing information signals or signaling information signals.

3. The circuit arrangement as defined in claim 2 wherein said switching means has a scanning frequency of $f_s = 1/nt_a = k \cdot f_i$ for $k = 1, 2, 3 \ldots$ where $f_i = 1/t_i$, $t_i$ being the pulse width of a bit of the dialing infomation signals or the signaling information signals.

4. The circuit arrangement as defined in claim 1 wherein said evaluation circuit comprises a squelch control circuit means having a response time less than the given interval.

5. The circuit arrangement as defined in claim 1 wherein the dialing information signals and signaling information signals are in the form of binary bits, said evaluation circuit having a response time less than the width of a single bit.

6. The circuit arrangement as defined in claim 5 wherein the binary bits representing "1" are a.c. signals of one frequency and the binary bits representing "0" are a.c. signals of another frequency, said evaluation circuit having a response time corresponding to the interval of a full wave period of whichever of the a.c. signals has the higher frequency.

7. The circuit arrangement as defined in claim 5 wherein the binary bits representing "1" are a.c. signals of one frequency and the binary bits representing "0" are a.c. signals of another frequency, said evaluation circuit having a response time corresponding to the interval of a half wave period of whichever of the a.c. signals has the higher frequency.

8. The circuit arrangement as defined in claim 6 wherein said evaluation circuit comprises coincidence circuit means responsive to zero passages of said a.c. signals.

9. The circuit arrangement as defined in claim 7 wherein said evaluation circuit comprises coincidence circuit means responsive to zero passages of said a.c. signals.

* * * * *